(12) United States Patent
Bärgman et al.

(10) Patent No.: US 8,558,679 B2
(45) Date of Patent: Oct. 15, 2013

(54) METHOD OF ANALYZING THE SURROUNDINGS OF A VEHICLE

(75) Inventors: Jonas Bärgman, Göteborg (SE); Jan-Erik Källhammer, Linköping (SE); Sven Rönnbäck, Umeå (SE); Kalevi Hyypää, Luleå (SE); Tomas Bergiund, Råneå (SE); Håkan Fredriksson, Luleå (SE)

(73) Assignee: Autoliv Development AB, Värgärda (SE)

( * ) Notice: Subject to any disclaimer, the term of this patent is extended or adjusted under 35 U.S.C. 154(b) by 575 days.

(21) Appl. No.: 12/445,093

(22) PCT Filed: Sep. 28, 2007

(86) PCT No.: PCT/SE2007/000860
§ 371 (c)(1),
(2), (4) Date: Mar. 1, 2010

(87) PCT Pub. No.: WO2008/044979
PCT Pub. Date: Apr. 17, 2008

(65) Prior Publication Data
US 2010/0164701 A1    Jul. 1, 2010

(30) Foreign Application Priority Data
Oct. 11, 2006   (GB) .................................. 0620183.4

(51) Int. Cl.
    *B60Q 1/00*           (2006.01)
    *G08G 1/16*           (2006.01)
    *G08G 5/04*           (2006.01)
    *G01S 13/00*         (2006.01)
    *B60K 28/10*        (2006.01)
    *G05D 23/00*        (2006.01)
    *G05D 16/00*        (2006.01)

(52) U.S. Cl.
USPC ........... 340/436; 340/435; 340/903; 340/961; 342/70; 180/274; 700/300; 700/301

(58) Field of Classification Search
USPC .................................. 340/932.2, 907; 706/20
See application file for complete search history.

(56) References Cited

U.S. PATENT DOCUMENTS 6,218,961 B1 *   4/2001   Gross et al. .................... 340/903
7,602,312 B2 *   10/2009   Danz et al. ................. 340/932.2
2003/0011492 A1 *   1/2003   Owen et al. .................... 340/941

(Continued)

FOREIGN PATENT DOCUMENTS

GB       1 447 985        9/1976
GB       2 379 111        2/2003

(Continued)

*Primary Examiner* — Steven Lim
*Assistant Examiner* — Pameshanand Mahase
(74) *Attorney, Agent, or Firm* — Brinks Hofer Gilson & Lione

(57) ABSTRACT

A method of analyzing the surroundings of a vehicle, comprising the steps of: gathering data regarding objects in the vicinity of the vehicle; analyzing the data to determine regions of empty space around the vehicle; creating one or more signatures representing at least some of the regions of empty space; and storing the signatures for later retrieval.

23 Claims, 2 Drawing Sheets

(56) References Cited

U.S. PATENT DOCUMENTS

| | | | |
|---|---|---|---|
| 2003/0191583 A1* | 10/2003 | Uhlmann et al. | 701/208 |
| 2004/0098197 A1* | 5/2004 | Matsumoto et al. | 701/301 |
| 2004/0263355 A1* | 12/2004 | Carroll | 340/907 |
| 2005/0002558 A1* | 1/2005 | Franke et al. | 382/154 |
| 2005/0107955 A1* | 5/2005 | Isaji et al. | 701/301 |
| 2005/0131581 A1 | 6/2005 | Sabe et al. | |
| 2005/0159879 A1* | 7/2005 | De Graeve et al. | 701/200 |
| 2005/0246100 A1* | 11/2005 | Nath et al. | 701/301 |
| 2006/0041375 A1* | 2/2006 | Witmer et al. | 701/208 |
| 2006/0139181 A1 | 6/2006 | Danz | |

FOREIGN PATENT DOCUMENTS

| | | |
|---|---|---|
| JP | 2000-171250 | 6/2000 |
| WO | WO 2004/086084 A1 | 10/2004 |
| WO | WO 2006/084385 A1 | 8/2006 |

* cited by examiner

METHOD OF ANALYZING THE SURROUNDINGS OF A VEHICLE

CROSS REFERENCE TO RELATED APPLICATIONS

This application claims priority to Great Britain Patent Application No. 062018.4, filed Oct. 11, 2006 and PCT/SE2007/000860, filed Sep. 28, 2007.

FIELD OF THE INVENTION

THIS INVENTION relates to a method of analyzing the surroundings of a vehicle, and in particular concerns a method allowing a successively more detailed map of the vehicle's surroundings to be built up over time.

BACKGROUND OF THE INVENTION

It has previously been suggested to detect the surroundings of a vehicle, for instance using an on-board RADAR or LIDAR system, and to relate the detected objects to an approximate position, provided by a positioning system such as the global positioning system (GPS) or the inertial navigation system (INS). If the vehicle is driven along the same or a similar route in the future, the objects may be detected again, and with repeated measurements of this type the position of the objects may be determined more and more accurately. Once this has been done, detection of these objects in the future may allow the location of the vehicle itself to be determined with a higher level of accuracy than can be achieved through GPS or INS alone.

Such systems are of utility both for driver-controlled vehicles (such as conventional cars) and also for automatically or semi-automatically controlled vehicles, such as assistive and industrial mobile robots. In the latter case, the system may be used to assist in the navigation or control of the vehicle.

It is an object of the present invention to seek to provide an improved vehicle location system of this type.

SUMMARY OF THE INVENTION

Accordingly, one aspect of the present invention provides a method of analyzing the surroundings of a vehicle, comprising the steps of: gathering data regarding objects in the vicinity of the vehicle; analyzing the data to determine regions of empty space around the vehicle; creating one or more signatures representing at least some of the regions of empty space; and storing the signatures for later retrieval, characterized by the step of creating one or more signatures comprising the step of creating one or more primitives describing at least some of the regions of empty space.

Preferably, the step of creating one or more primitives comprises the step of expanding a shape around a position until a perimeter of the shape reaches a detected object.

Conveniently, the method further comprises the step, when a perimeter of the shape reaches a detected object, of defining one or more further shapes and expanding the further shapes in directions that avoid the detected object.

Advantageously, an initial shape is defined to expand from a position which relates substantially to the location of the vehicle, and the above two steps are repeated until substantially all of the available empty space around the vehicle has been accounted for.

Preferably, the shape is a sector of a circle, and wherein expansion of the sector occurs around a chord thereof.

Conveniently, a detected object may be disregarded if the object is determined to be moving.

Advantageously, a detected object may be disregarded if the shape of the object substantially matches a predetermined shape.

Preferably, a detected object may be disregarded if the number of detected measurements comprising the object is below a predetermined threshold.

Conveniently, if the same region of space is analyzed on multiple occasions, a detected object may be disregarded if the object is not detected on every occasion.

Advantageously, a signature comprises one or more primitives.

Preferably, a signature comprises an expression of a relationship between two primitives.

Conveniently, a signature comprises an expression of a relationship between two subsequently determined primitives.

Advantageously, the step of storing the signatures comprises the step of storing the signatures in combination with a position determined from a positioning system.

Preferably, the method further comprises the step of comparing newly-detected signatures with stored signatures associated with identical or similar positions to the newly-detected signatures, to determine the location of the vehicle with respect to the stored signatures.

Conveniently, the method comprises the step of storing multiple signatures associated with identical or similar positions to improve the accuracy of the stored signatures.

Advantageously, the method further comprises the step of correcting the position of the vehicle, with respect to the positioning system, based on one or more matches between one or more newly-detected signatures and one or more stored signatures.

Preferably, the method further comprises the step of generating an output signal if an object is detected in a location which had previously been determined to comprise empty space.

Conveniently, the output signal is a collision avoidance signal, to activate collision avoidance systems of the vehicle in an attempt to avoid a collision with the object.

Conveniently, the output signal is an alarm signal, to generate an alarm.

Preferably, the signatures are compiled into voronoi graphs.

Another aspect of the present invention provides a method of plotting a course for a vehicle, comprising the steps of: analyzing the surroundings of the vehicle in accordance with the above, or receiving data gathered in accordance with the above; and plotting a course for the vehicle based upon the stored signatures.

Conveniently, the method comprises the step of plotting a course for the vehicle that passes through or close to the centers of each of a plurality of successively-determined primitives.

A further aspect of the present invention provides a vehicle comprising: an object detection arrangement; a positioning arrangement; a processing arrangement operable to carry out any of any the preceding steps; and a memory to store signatures so created.

Advantageously, the vehicle is a driver-controlled vehicle.

Alternatively, the vehicle is an autonomous or semi-autonomous vehicle.

Another aspect of the present invention provides a computer program comprising computer program code adapted to perform all of the steps of any of the above when run on a computer.

A further aspect of the present invention provides a computer program according to the above, embodied on a computer-readable medium.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF THE INVENTION

Figure 1A:
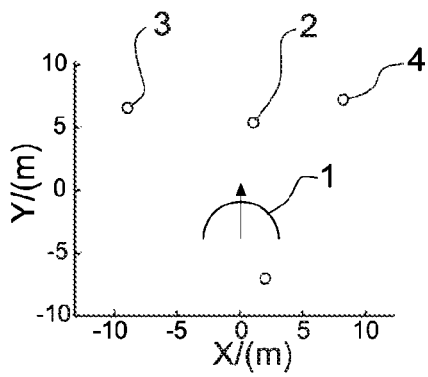
FIG. 1a illustrates a sector of a circle expanded around a chord.

A vehicle having a vehicle location system embodying the present invention is equipped with an object detection arrangement, such as a RADAR or LIDAR system (although other techniques such as Stereovision and ultrasound may also be used) as well as a positioning system, such as GPS or INS. As the vehicle is driven, the object detection arrangement is able to detect the distance and bearing of nearby objects with respect to the vehicle, and the positioning system is able to provide a determination (which may include a degree of error which can be as high as ±100 m or more) of the position of the vehicle on the Earth's surface.

The vehicle also includes a processing arrangement, operable to receive the signals output by the object detection arrangement and the positioning system, and a memory to store data for subsequent retrieval.

In preferred embodiments of the invention, the signals gathered by the object detection arrangement over a short period of time (for instance, around 100 ms or less for a driver controlled vehicle, although this will depend on the speed of the vehicle and for slower vehicles such as automated wheelchairs a period of 250 ms or more may suffice), are compiled to provide a "snapshot" of detected objects around the vehicle's current position. This snapshot is then analyzed by the processing arrangement to arrive at one or more signatures representing regions of empty space around the vehicle. These signatures determined by the processing arrangement are stored in the memory, in association with a location in space as determined by the positioning system.

At a subsequent time, if the positioning system determines that the vehicle is in a location near the stored locations of one or more signatures, the signatures can be retrieved from the memory and compared against signatures relating to regions of empty space detected at the current time by the object detection system. As discussed above, this can allow more accurate mapping of the vehicle's surroundings, and ultimately more accurate determination of the vehicle's position.

As the vehicle travels along a given route repeated times, certain regions will sometimes appear as free space, and at other times will not appear as such. Such regions will, in general, correspond to empty areas which sometimes contain one or more objects, and a common example is a parking space which sometimes contains a parked vehicle. Other examples include other traffic lanes (which will sometimes be empty and sometimes occupied) and pedestrian crossings (which will sometimes be clear and sometimes contain pedestrians on their way across a road). In preferred embodiments, such areas will be designated as empty in the stored signatures, as this is the default position, and this will allow a more accurate map of permanent features to be built up.

An example of the building of signatures will now be discussed. When a snapshot of the vehicle's surroundings has been captured by the object detection system, an algorithm is applied to the detected "map" to derive the signatures. As a first step, a specific shape is iteratively expanded around the position of the vehicle on the map. The example below will be discussed with reference to a circle or a sector of a circle, but it will be appreciated that other shapes may be used, such as a sphere (for 3D analysis) or octagon, or any other suitable primitive or complex shape.

Figure 1B:
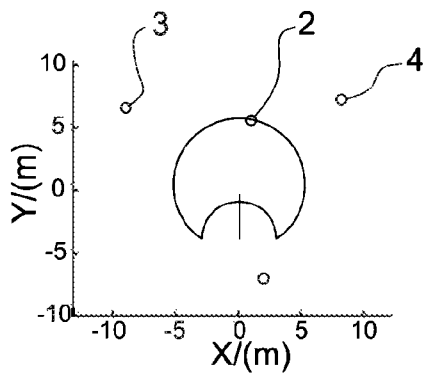
FIG. 1b illustrates a sector of a circle expanded around a chord, from an initial radius to a final radius.
Figure 1C:
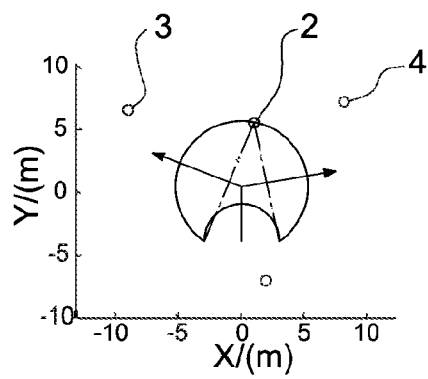
FIG. 1c shows two further circle sectors expanded, one to the left and one to the right of a measurement point.
Figure 1D:
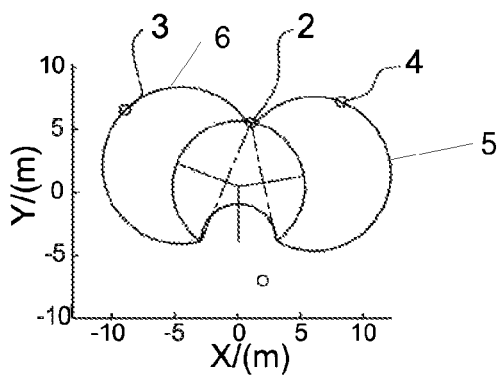
FIG. 1d shows the two further circle sectors expanding until a perimeter thereof meets a further measurement point.

The shape is expanded around the vehicle's position until the edge of this shape encounters a cluster of measurements. A cluster of measurements will, in general, correspond to a detected object near the vehicle. For the case of a circle, the radius of the circle is expanded until any part of the circumference of the circle encounters a measurement. With reference to FIG. 1a, a sector 1 of a circle is expanded around a chord, being a line passing through the vehicle's position, from an initial radius to a final radius, at which point (see FIG. 1b) a measurement 2 is encountered. At this point, the expansion is stopped, and two further circle sectors 5, 6 are expanded, one to the left and one to the right of the measurement 2, each around a chord defined by a line connecting the detected measurement 2 and the left or right edge of the original chord passing through the vehicle's position, as shown in FIGS. 1c and 1d. It will be appreciated that the detected measurement 2 will not interfere with the expansion of the new circle sectors 5, 6. As can be seen in FIG. 1d, each of the new circle sectors 5, 6 expands until a perimeter thereof meets a further measurement 3, 4.

This process is then continued for each of the new expanding circle sectors. Each expansion step calculates the maximum size for the circle sector in a specific expanding direction. If no measurement is encountered, the expansion is stopped when the circle sector reaches a maximum size, which will depend on the size of the vehicle and the range of the object detection arrangement, and for a conventional motor car this maximum size may be around 30 m. The process of expanding and splitting circle sectors continues until all of the available empty space on the map detected by the object detection system has been accounted for. The expansion algorithm does not allow a chord or radius less then a predetermined size, and once again this will depend upon the size of the vehicle, and for a conventional vehicle may be around 1-2 m. Once further expansion would require a chord or radius less then the predetermined size, the expansion in that particular direction is halted. Expansion is also halted if it is determined that the process has described a "loop" and has returned to a point which has already been considered, and this may be determined by checking whether the same index or coordinates for a point on the map of the surroundings has been used more than once.

In preferred embodiments, there may be additional criteria which allow measurements effectively to be overlooked, and for the expansion and splitting process to continue as though these measurements are not present. These exceptions may include: measurements which appear to be moving, which are likely to represent cyclists, pedestrians or other vehicles; cases where the number of measurements in a cluster is too few; detected objects which have not been detected on previous occasions, which are likely to be non-fixed objects such as parked cars or obstacles in the road; and objects having certain shapes, which can be classified as moveable objects. Probabilistic criteria, such as median filtering, may also be used to disregard certain objects.

For a map detected by the object detection arrangement, a number of primitives are determined, each corresponding to a circle sector at maximum expansion (i.e. at the point at which a measurement was encountered at the circumference of the circle sector). Relationships between primitives (preferably consecutive primitives) are computed as signatures, which represent the regions of empty space in the map. These signatures are stored in the memory, as discussed above, along with an associated location provided by the positioning system. In alternative embodiments, each signature may simply comprise one or more primitives.

As discussed above, when the vehicle is in the vicinity of the stored locations, the signatures can be retrieved and compared to currently-detected data. The stored signatures can also be used as a position reference to other detected features, such as various types of intersection, traffic signs, lanes, traffic flow or other information. When, for example, an intersection has been analyzed using the above method and is approached again, the stored signatures can be related to other stored information and newly-detected information relating to the intersection. This can allow accurate placement of the vehicle, and also assist in determining whether objects are behaving unusually, such as vehicles moving in an unexpected direction in a particular lane.

An advantage of this approach is that the signatures representing the empty space around the vehicle can be stored efficiently using relatively small amounts of data. For instance, the signatures discussed above comprising relationships between primitives of circle sectors and chords can be stored using only seven parameters, as can be seen with reference to FIG. 2.

In this case, the definition of a signature is based on the angles between the chord vectors and the vector connecting the two circle sectors. The chord lengths and the radius of the circle sectors are also contained in the definition. The signature itself is expressed as:

$$\text{signature} = \{r_1, r_2, c_1, c_2, \gamma_1, \gamma_2, d\}$$

where $r_1$ and $r_2$ are the radii of the two circles, $c_1$ and $c_2$ are the chord lengths of the two circles, $\gamma_1$ and $\gamma_2$ are the chord angles relative to the axis of the signature, and d is the length.

Figure 2:
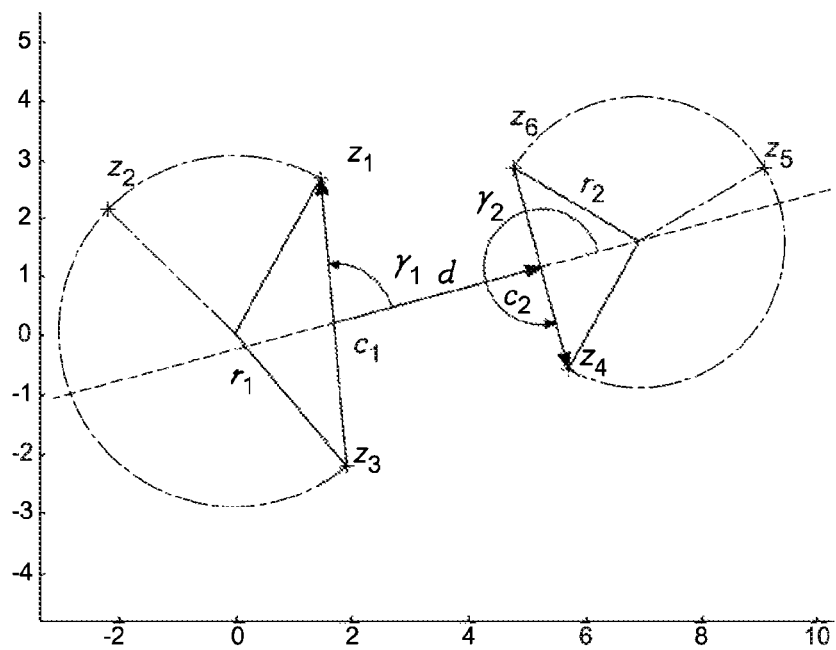
FIG. 2 illustrates relationships between primitives of circle sectors and chords stored using only seven parameters.

Referring to FIG. 2, the endpoints of the chord of the first circle sector are $z_1$ and $z_3$, and the endpoints of the chord of the second circle sector are $z_4$ and $z_6$ respectively. The chord lengths are therefore defined by $$c_1 = |z_1 - z_3| \text{ and}$$

$$c_2 = |z_4 - z_6|.$$

The frame attached to the signature has its origin at $$\frac{(z_1 + z_3)}{2}.$$

The length d of the signature is defined as the distance between the mid points of the circle chords, $z_d = (z_4 + z_6) - (z_1 + z_3)$, $d = |z_d|$ The angles of the chords relative to the X-axis of the signature are $\gamma_1 = \angle(z_1 - z_3)\bar{z}_d$, $\gamma_2 = \angle(z_4 - z_6)\bar{z}_d$.

A newly-detected signature may be matched against previously-stored reference signatures by the Mahalanobis distance. Let $X_s$ be a vector with the seven signature parameters:

$$X_s = [r_1 r_2 c_1 c_2 \gamma_1 \gamma_2 d]$$

Let $Z_s$ be the a vector that has the observed signature properties and $X_s(n)$ be the known properties of signature n. Innovation covariance $S_s(n)$ is calculated as $S(n) = E[X_s(n)X_s(n)^T] + E[Z_s Z_s^T]$.

The Mahalanobis distance, $v_{sig}(n) = (Z_s - X_s(n))^T S_s(n)^{-1} (Z_s - X_s(n))$, is $\chi^2$ distributed as it is assumed that the noise involved is normally distributed. The distance variable $v_{sig}(n)$ is also dimensionless and compensates for interactions between the variables. The match $v_{sig}(n)$ with the highest probability is taken, and checks are made against tables to determine if the match is significant. The test has seven degrees of freedom and is equal to the number of parameters of each signature. The confidence level of the $\chi^2$ distribution with a given number of degrees of freedom may be determined from statistical tables.

It should be appreciated that the invention is not limited to the use of signatures as discussed above, and any appropriate method of producing signatures representing regions of empty space around the vehicle may be used.

Signatures gathered may be compiled into Voronoi graphs, as a skilled person will understand. It will therefore be possible to apply statistical methods to get an estimate of the accuracy of the calculated Voronoi tree. It is also possible to apply prediction, tracking and estimation through techniques such as Kalman filters, particularly extended Kalman filer techniques. These statistical methods can be applied to detect changes, isolate spurious results and detect erroneous sensor readings.

In conventional methods discussed above, each measurement corresponding to a detected object must be stored individually, which invariably leads to the storage of a very large number of locations, occupying a large amount of memory space. In addition, the objects are often classified according to their shape, which increases the storage space required. When the stored measurements must be retrieved and compared against newly-detected data, therefore, the amount of processing required is high, increasing the expense and decreasing the speed of the system as a whole.

In contrast, storing signatures representing regions of empty space can be, as seen above, very efficient. In the example given, a signature representing a large region of space can be stored using only seven parameters. The nature and shape of objects and edges themselves need not be stored, and instead the shape of the empty space is stored.

The method carries the additional advantage that the empty space actually defines the area of clear passage available to the vehicle, and this can be useful when navigating autonomous or semi-autonomous vehicles. The method using signatures as described above can be of particular application to the control and navigation of such vehicles, as the line of length d connecting the centers of the chords $c_1, c_2$ represents a clear path along which the vehicle may travel. When plotting a course through space, therefore, the vehicle may proceed along these lines, from the centre of one chord to the next, and it will be appreciated that the course thus followed will be approximately in the middle of the free space available, thus minimizing the chance of the vehicle colliding with any other objects. It is not necessary, however, for the vehicle course to follow these lines closely, except in the regions close to the chords of the circle segments. In general, it is unlikely to be efficient to store all circle sectors that are measured, but in preferred embodiments only the circle segments that mark a fork in the path (i.e. where the perimeter of the sector has encountered a measurement) where two or more of the chords following the fork are longer than predetermined length. This length may be, for example 10 m or more for a vehicle the size of a conventional motor car, or may be around 3.5 m in the case of a smaller vehicle, such as a wheelchair.

In alternative embodiments, several circle sectors in between two circle sectors that form a signature may be stored, either as part of the signature or as supplementary information to assist in navigation through free space.

Figure 3:
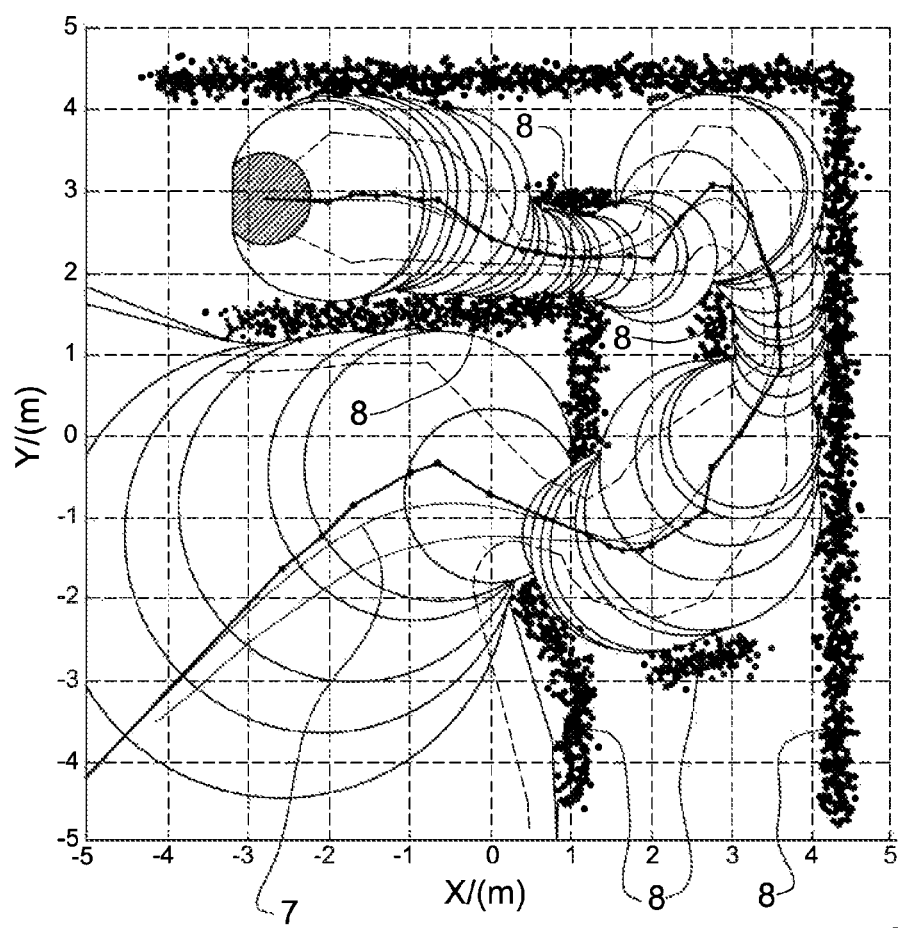
FIG. 3 shows a course for an autonomous vehicle plotted among obstacles in accordance with this invention.

In preferred embodiments of the invention, when an expanding circle sector encounters a measurement and is split into left and right expanding circle sectors, the expanding circle sector having the longest chord is followed when plotting a route, so that the widest possible space is utilized. FIG. 3 shows a course 7 for an autonomous vehicle plotted among obstacles 8 in this way.

This method may also find applications for driver-controlled vehicles. For instance, a vehicle could be placed into an automatic parking mode, in which this method is used to control the vehicle temporarily to perform an awkward reverse parking manoeuvre, or to park the vehicle in conditions where visibility is poor, due to low light levels or obscuration by other objects.

For autonomous or semi-autonomous vehicles, if an object is detected in a region which has previously been determined to be empty space, an alarm may be raised, or an operator may be informed.

It is envisaged that several vehicles (which may be driver controlled or autonomous or semi-autonomous) may share detected signatures among themselves, either directly or via a central server or network. In this way, data gathered by any of the vehicles may be used by any of the others, and the stored information held by each vehicle will be of greater accuracy and utility. It is expected that a plurality of autonomous or semi-autonomous vehicles sharing positional information may also be able to plot routes effectively through environments so that the possibility of collisions is minimized or eliminated.

In detecting objects when performing methods as discussed above, it is envisaged that objects below a certain height will be disregarded, since it is expected that the vehicle can pass over such an object without difficulty. In the case of a normal road vehicle, the height below which objects are disregarded may be around 0.2 m.

It will be appreciated that embodiments of the present invention may provide effective and computationally efficient methods of locating a vehicle with respect to its surroundings, which will find utility in many fields.

While the above description constitutes the preferred embodiment of the present invention, it will be appreciated that the invention is susceptible to modification, variation, and change without departing from the proper scope and fair meaning of the accompanying claims.

The invention claimed is:

1. A method of analyzing the surroundings of a vehicle, comprising the steps of:
    gathering data regarding one or more locations of objects in the vicinity of the vehicle;
    analyzing the data to determine regions of empty space around the vehicle;
    creating one or more signatures by creating one or more primitives describing at least some of the regions of empty space by expanding a shape around a position until a perimeter of the shape reaches at least one of the one or more locations of the objects and by defining one or more further shapes and expanding the one or more further shapes in directions that avoid the at least one of the one or more locations of the objects; and
    storing the signatures for later retrieval and ignoring all information relating to the one or more locations of the objects for which data have been gathered.

2. The method according to claim 1 wherein an initial shape is defined to expand from a position which relates substantially to the location of the vehicle, and the steps of expanding a shape and defining one or more further shapes are repeated until substantially all of the available empty space around the vehicle has been analyzed.

3. The method according to claim 1, wherein the shape is a sector of a circle, and wherein expansion of the sector occurs around a chord thereof.

4. The method according to claim 1, wherein a detected object may be is disregarded if the object is determined to be moving.

5. The method according to claim 1, wherein a detected object is disregarded if the shape of the object substantially matches a predetermined shape.

6. The method according to claim 1, wherein a detected object is disregarded if the number of detected measurements comprising the object is below a predetermined threshold.

7. The method according to claim 1, wherein if the same region of space is analyzed on multiple occasions, an object detected on one occasion is disregarded after the object has not been detected on a subsequent occasion.

8. The method according to claim 1, wherein a signature comprises one or more primitives.

9. The method according to claim 1, wherein a signature comprises an expression of a relationship between two primitives.

10. The method according to claim 9, wherein a signature comprises an expression of a relationship between two subsequently determined primitives.

11. The method according to claim 1, wherein the step of storing the signatures comprises the step of storing the signatures in combination with a position determined from a positioning system.

12. The method according to claim 11 further comprising the step of comparing newly-detected signatures with stored signatures associated with identical or similar positions to the newly-detected signatures, to determine the location of the vehicle with respect to the stored signatures.

13. The method according to claim 11, comprising the step of storing multiple signatures associated with identical or similar positions to improve the accuracy of the stored signatures.

14. The method according to any one of claim 11, further comprising the step of correcting the position of the vehicle, with respect to the positioning system, based on one or more matches between one or more newly-detected signatures and one or more stored signatures.

15. The method according to claim 1, further comprising the step of generating an output signal if the object is detected in a location which had previously been determined to comprise empty space.

16. The method according to claim 15, wherein the output signal is a collision avoidance signal, to activate automatic collision avoidance systems of the vehicle in an attempt to avoid a collision with the object.

17. The method according to claim 15, wherein the output signal is an alarm signal, to generate an alarm.

18. The method according to claim 1, wherein the signatures are compiled into voronoi graphs.

19. The method according to claim 1 further comprising the steps of plotting a course for plotting a course for the vehicle based upon the stored signatures.

20. The method according to claim 19, comprising the steps of:
analyzing the surroundings of the vehicle or receiving data gathered; and
plotting a course for the vehicle that passes through or close to the centers of each of a plurality of successively-determined primitives.

21. A vehicle comprising:
an object detection arrangement configured to change a scanning area relative to the vehicle in response to a detection of an object;
a positioning arrangement;
a processing arrangement operable to carry out the steps of:
gathering data from the object detection arrangement regarding one or more locations of objects in the vicinity of the vehicle;
analyzing the data to determine regions of empty space around the vehicle;
directing the object detection arrangement upon detection of the object to change the scanning area in a direction that avoids the object;
creating one or more signatures by creating one or more primitives describing at least some of the regions of empty space;
ignoring all information relating to the one or more locations of the objects for which the data have been gathered; and
storing the signatures for later retrieval; and
a memory to store the signatures.

22. The vehicle according to claim 21 in which the vehicle is driver controlled.

23. The vehicle according to claim 21 in which the vehicle is autonomous or semi-autonomous.

* * * * *

UNITED STATES PATENT AND TRADEMARK OFFICE
CERTIFICATE OF CORRECTION

PATENT NO.       : 8,558,679 B2                                                                 Page 1 of 1
APPLICATION NO. : 12/445093
DATED            : October 15, 2013
INVENTOR(S)      : Bärgman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Fifteenth Day of September, 2015

Michelle K. Lee
*Director of the United States Patent and Trademark Office*